United States Patent [19]

Miller

[11] 4,349,736

[45] Sep. 14, 1982

[54] METHOD FOR LOCATING AND EVALUATING SUBSURFACE URANIUM DEPOSITS HAVING AN APPARENT GRADE OF UP TO APPROXIMATELY 5% CONTAINED U$_3$O$_8$

[76] Inventor: Bob R. Miller, 435 W. Fremont Dr., Littleton, Colo. 80123

[21] Appl. No.: 81,453

[22] Filed: Oct. 3, 1979

Related U.S. Application Data

[63] Continuation-in-part of Ser. No. 842,596, Oct. 17, 1977, abandoned.

[51] Int. Cl.$^3$ .................. G01D 18/00; G01V 5/00
[52] U.S. Cl. .................................. 378/83; 250/253; 250/269; 250/252.1; 378/45
[58] Field of Search ............... 250/252, 253, 254, 269, 250/264, 265, 496, 497, 272, 273

[56] References Cited

U.S. PATENT DOCUMENTS

| | | | |
|---|---|---|---|
| 3,246,157 | 4/1966 | Reed et al. | 250/269 X |
| 3,453,433 | 7/1969 | Alger et al. | 250/269 X |
| 3,633,032 | 1/1972 | Stein | 250/496 X |
| 3,686,503 | 8/1972 | Givens et al. | 250/269 |
| 3,864,569 | 2/1975 | Tittman | 250/269 X |
| 3,976,879 | 8/1976 | Turcotte | 250/269 X |
| 4,048,495 | 9/1977 | Ellis | 250/269 X |

*Primary Examiner*—Davis L. Willis
*Attorney, Agent, or Firm*—Edwin L. Spangler, Jr.

[57] ABSTRACT

This invention relates to a novel method for both locating and evaluating subsurface uranium-bearing formations containing an apparent grade of up to approximately 5% of contained U$_3$O$_8$ which comprises the steps of taking readings of the natural gamma count from an unknown radioactive formation on both the shielded and unshielded detectors with the external gamma source shielded, uncovering the external gamma source and reading the count-rate on both the shielded and unshielded detectors, comparing the ratio of the natural gamma count recorded by the unshielded and shielded detectors with a similar ratio recorded by the same detectors in a uranium-bearing matrix of known concentration no greater than approximately 5% in a state of equilibrium to ascertain first if a state of disequilibrium exists and, secondly, if a state of disequilibrium is found to exist then to determine if this state of apparent disequilibrium is being influenced by the presence of either thorium or potassium or, alternatively, is primarily the result of a disequilibrium between uranium and its daughter products. The natural radiation seen by the shielded probe provides the data for a determinatin of the apparent grade of U$_3$O$_8$ used in later calculations. Finally, if the disequilibrium is found to exist between uranium and its daughter products, then determining the direction and approximate order of magnitude of the disequilibrium by analyzing the ratio of the count rates detected by the shielded and unsheilded detectors ascertained from a suspected uranium-bearing formation, the former seeing only the natural radiation while the latter looks at essentially all the radiation including that induced by the external source, and comparing it with a comparable ratio taken by the same detectors from a known uranium-bearing formation containing not more than approximately 5% U$_3$O$_8$ at equilibrium to see whether the back-scattered radiation was substantially attenuated or not within the formation or, alternatively, increased due to induced X-ray fluorescence.

4 Claims, 4 Drawing Figures

METHOD FOR LOCATING AND EVALUATING SUBSURFACE URANIUM DEPOSITS HAVING AN APPARENT GRADE OF UP TO APPROXIMATELY 5% CONTAINED U$_3$O$_8$

This is a continuation-in-part of U.S. Ser. No. 842,596 filed Oct. 17, 1977 and entitled "METHOD AND APPARATUS FOR LOCATING SUBSURFACE URANIUM DEPOSITS", now abandoned.

The search for commercially valuable uranium ore bodies has, in recent years, become more and more worthwhile due primarily to the several peacetime uses for uranium, not the least of which is, of course, electric power generation. The usual way of locating these subsurface ore bodies is to drill numerous bore holes in a selected area having favorable geologic characteristics and then measuring the natural gamma radiation emitted by the various formations that have been penetrated, using standard downhole gamma ray logging devices. Then, by comparing the gross gamma activity with that of known concentrations of uranium in calibrated test holes, decisions are made concerning the uranium concentration believed to be present in the unknown ore body. Unfortunately, such an over-simplified approach has led many to an erroneous and very costly decision.

The reasons why this simplistic approach is unreliable are both numerous and complicated, nevertheless, some of the more important ones are worth examining. To begin with, uranium itself, while radioactive, emits far fewer gamma rays than certain of its so-called "daughter products" into which it is continuously disintegrating. Foremost among these gamma emitting daughter products are those of the radium/decay-series. These gamma rays can be both detected and quantified by the logging equipment and the activity thus determined is quite easily converted to a basis of contained U$_3$O$_8$ in the formation if the formation is in equilibrium (Dodd, P. H. et al—1971 Uranium Prospecting Handbook). Accurately, or even inaccurately, determining the so-called "mix" between U$_3$O$_8$ and its disintegration products responsible for the measured level of natural downhole radiation is no simple task and, in fact, it is one that the industry has yet to solve with any degree of certainty. The factors responsible for this are primarily due to the fundamental differences between uranium and its daughter products in terms of chemical characteristics; solubility, reactivity, etc. Add to this the geological differences such as the variables of high porosity and the permeability of the formations in which uranium usually occurs and one faces a situation where ground water alone can upset the equilibrium normally existing in the uranium/daughter product system to a considerable degree. To further complicate matters, this ground water can vary in both pH and eH and even contain dissolved mineral salts which react chemically with the system thus further disturbing its equilibrium. Whatever the cause of the disequilibrium, the gross gamma count is seldom a reliable yardstick by which to quantify the uranium in place in a subsurface formation. In fact, as will appear presently, even the basic determination of whether the uranium/daughter product system is in a state of equilibrium or disequilibrium becomes a major undertaking.

Two basically different approaches are presently being employed to evaluate the state of the system. The first of these is the more or less straightforward technique wherein a physical sample (core) is taken from the formation and analyzed chemically, or radiometrically, or both, to provide the data by which the analyst can establish the state of disequilibrium by comparing these data with the calculated gamma ray values. This procedure is extremely expensive, time-consuming and not, by any means, free of error. To begin with, it sometimes costs from three to six times as much to core a hole as it does to drill it. Not infrequently, parts of the core are lost or at least cannot be recovered. Also, the sample sizes are quite small and there is no assurance that the sample taken is representative of the ore body although, because of the lack of better data, the observer is inclined to assume that it is. Contaminants also enter into the picture on occasion. A far more pressing problem, however, is that the formation continues to be core drilled more often than not while awaiting the analysis of the early cores which frequently takes several weeks to complete. Obviously, had the information been immediately available and shown the formation to be deficient in uranium, further exploration would have been discontinued right away.

The second of these methods is less widely used although it is the more realiable of the two. Basically it involves the "in situ" measurement of the fission products of uranium that are produced when an ore-bearing formation is irradiated with high energy neutrons, all of which is clearly explained in Given et al U.S. Pat. No. 3,686,503. So far at least, reports from the field seem to indicate that the latter method is both practical and accurate. It is certainly less costly and much faster than coring in providing the disequilibrium data necessary to make a decision. As far as disadvantages are concerned, the main ones seem to be the oversize drill hole that is required along with the longer than normal time necessary to acquire quantitative downhole data. Also, the equipment used is highly sophisticated, very expensive and requires highly skilled personnel to operate it successfully. For these reasons, such equipment is not generally available to the industry.

There remains, therefore, a real need for both a fast and an inexpensive method for initially determining whether or not a state of disequilibrium exists in a system containing uranium and its daughter products followed by, hopefully, finding out what sort of a shift in the equilibrium has taken place together with possibly even a rough evaluation of the concentration of the uranium present. While some technique for a precise quantitative, or at least a semi-quantitative, evaluation would be helpful, it is by no means essential because, once the state of the ore body is known, the promising ones can be further evaluated by other methods.

In my co-pending application U.S. Ser. No. 842,596, now abandoned, I was under the impression that by first comparing a ratio of both high and low energy natural radiation detected in an unknown ore body with a similar ratio determined from a known uranium-bearing formation in equilibrium and, then introducing into the formation an emitter of gamma radiation and measuring the degree to which the gamma rays thus introduced have been absorbed by the formation, I could use this absorption as a basis for determining the relative proportions of uranium and its radium-series daughter products. I have now found, however, that in addition to this gamma ray absorption phenomena, yet another well-known phenomena is taking place, specifically, induced X-ray fluorescence, whose measured emissions when considered together with absorption data provide a good deal more information concerning the state of disequilibrium, if any, present in the formation as well as the direction in which this disequilibrium condition has shifted, i.e. an over abundance of uranium or a deficiency thereof in favor of its daughter products.

In addition, I have discovered that the data indicating either a uranium-rich or a uranium-deficient disequilibrium condition can, up to the present time, only be relied upon up to approximately a level of 5% or so apparent concentration of $U_3O_8$. Above this concentration, the rather meager data acquired to date indicates that certain anomolies take place, the significance of which is not yet fully understood.

The closest prior art known to me appears to be that cited by the Patent and Trademark Office in my co-pending application that has since been abandoned. Of the six references cited therein, only two appear to be pertinent, specifically, Ellis U.S. Pat. No. 4,078,495 and Tittman U.S. Pat. No. 3,864,569. I can see no way in which the Ellis tool could be used to provide the downhole data I require even if his gamma source was selectively shielded in the manner of the Tittman probe. Moreover, if Ellis' gamma source was, in fact, shielded, his probe would be useless in such a state to gather the data he requires for his downhole evaluation.

It is, therefore, the principal object of the present invention to provide a novel and improved method for locating commercially valuable deposits of uranium.

A second objective is the provision of a method of the type aforementioned that enables one to determine the state of disequilibrium existing within the uranium/daughter product system.

Still another object is to provide a method capable of at least roughly quantifying the relative proportions of $U_3O_8$ and its radium/series daughter products present within a subsurface deposit having an apparent grade of up to approximately 5% contained $U_3O_8$.

An additional objective is to provide a means for evaluating subsurface uranium-bearing deposits in which the data is immediately available that is needed to make at least a preliminary decision concerning the desirability of further tests.

Further objects of the invention are to provide an improved uranium exploration method which is simple, faster and much less expensive than prior art methods, and one that is readily adapted for use in various types of uranium-bearing formations.

Other objects will be in part apparent and in part pointed out specifically hereinafter in connection with the description of the drawings that follows, and in which.

Various researchers have recognized the fact that low energy gamma rays (<400 Kev range) which emanate from $^{235}U$ and the radium decay-series of the disintegration products of $^{238}U$ constitute a major portion of the gamma ray spectra upon which prospectors rely in their attempts to locate and evaluate commercially-viable uranium-bearing ore bodies. Compared with uranium itself, these radium/daughter products exhibit greatly increased gamma ray activity and, if not present in equilibrium with uranium, they provide false and misleading indications concerning the true amount of $U_3O_8$ present in a given deposit.

To further complicate the situation, if the deposit does, in fact, include appreciable quantities of uranium, its presence tends to significantly attenuate the low energy emissions from the radium/daughter products, leading to serious under estimation of the quantity of uranium present (Czubek, J. A. "Natural Selective Gamma Logging" Nucleonika, 13, 1968 89–104). The reason that this occurs is because of the mass absorption effect of the contained uranium. As a matter of fact, when the percentage of uranium contained within the deposit exceeds approximately 0.2% $U_3O_8$ by weight, the mass absorption effect begins to have a measurable influence upon the resultant lower energy (<200 Kev) gamma radiation reaching a downhole probe or detector.

I previously observed in accordance with the teaching of my earlier application that this absorption effect of uranium, instead of being a source of misinformation could, in fact, be used as the basis for more reliable information concerning the composition of the unknown ore body and the worthwhile values contained therein, if any. The key appeared to be that once having determined that a state of disequilibrium exists from an analysis of the natural radiation levels, one should then introduce a source of known gamma radiation into a position alongside the deposit being evaluated and measure the degree to which the radiation thus introduced into the formation was attenuated by the contained uranium values due to the mass absorption effect of the latter. Once such data was obtained, it could then be compared with data gathered from a known uranium-bearing deposit in equilibrium to establish a value for the contained $U_3O_8$ around the bore hole.

I have now discovered that, while the foregoing appears to remain valid with the external gamma sources used in those uranium-rich subsurface deposits in a state of disequilibrium that contain an apparent grade of $U_3O_8$ in excess of about 5%, below this level the attenuation effects of the contained uranium are masked by a totally different phenomenon. Instead, it has now been found in accordance with the teaching of the instant invention that below the level of an apparent grade of about 5% $U_3O_8$, what really happens is that the uranium present has produced considerable X-ray flourescence due to the photoelectric absorption resulting from the induced gamma radiation.

Figure 1:
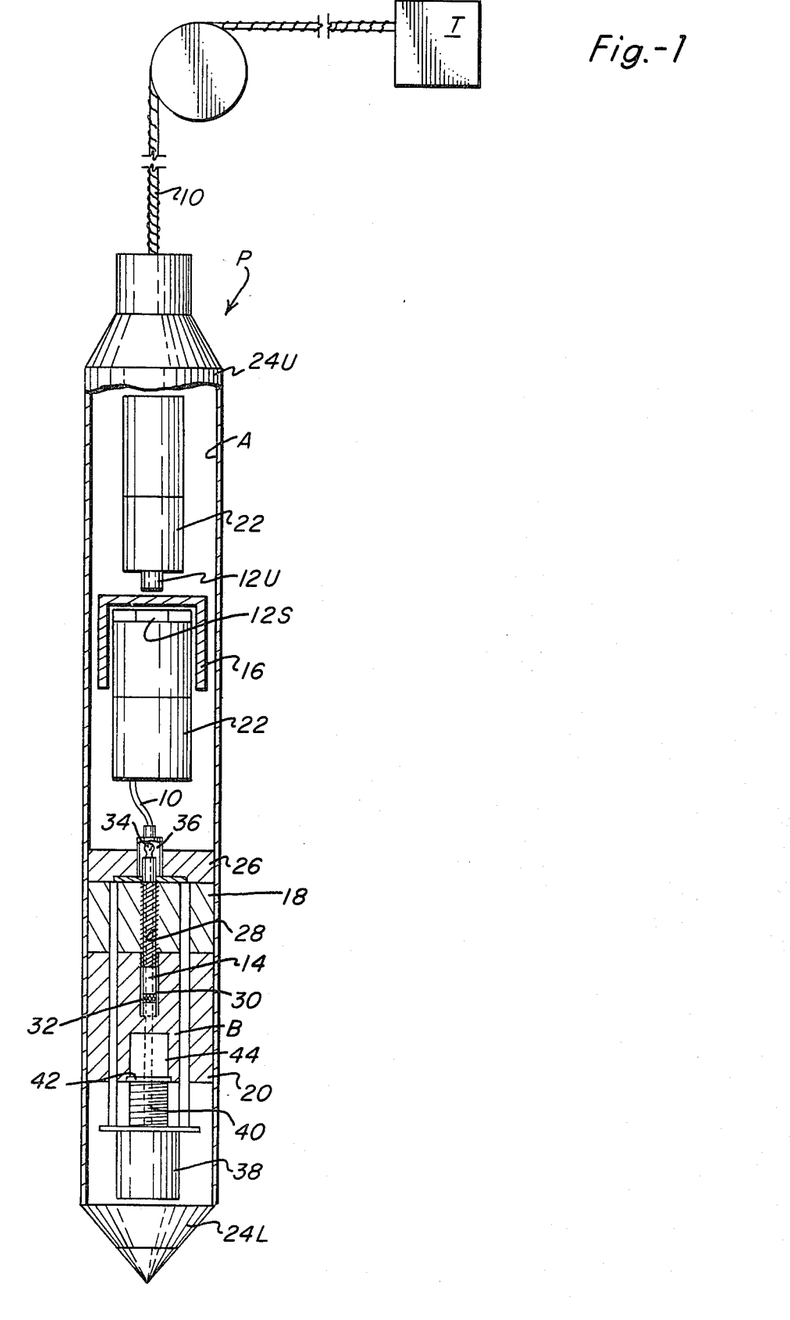
FIG. 1 is a schematic representation of the tool used in carrying out the method of the present invention.

A more complete understanding of the method is best attained if one first becomes acquainted with the analytical tool or downhole probe that is used in carrying it out, for which purpose reference will be made to FIG. 1 of the drawings. First of all, downhole probes capable of measuring gamma radiation from within a bore hole into or through the formation being evaluated are old and well known in the art. These units include, among other things, telemetering means indicated generally by reference numeral 10 by virtue of which the gamma radiation levels detected downhole are transferred to suitable read-out instrumentation T located at the surface. Such means, by themselves, form no part of the invention nor do the detectors 12U and 12S, the source of induced gamma radiation 14 or the various shields 16, 18 and 20 or, for that matter, electronics packages 22. Conventional means (not shown) are, of course, provided for raising and lowering the tool within the bore hole and locating its position therein.

The tool which has been broadly designated by reference character "P" provides the basis for practicing the method, but, in addition, its manner of use is unique because one must learn how to operate it to differentiate between the gamma radiation generated from within the radioactive elements contained in the deposit and those reappearing at the detector that have been introduced externally and either attenuated therein or caused to reappear in another form, i.e. as X-rays. In other words, to be able to even arrive at a gross evaluation of the state of the deposit (disequilibrium factor) the analyst must first be able to isolate the effects being induced from those that already existed naturally.

Contained within a suitable case 24 closed at both ends will be found two compartments A and B separated from one another by a partition wall 26 and a fixed lead shield 18 containing an axial bore 28 housing a brass tube 30 filled with powdered tungsten. The source of induced gamma radiation 14 is housed in the lower end of tube 30 and kept in place by a plastic plug 32. The upper end of tube 30 terminates in a male plug 34 which mates with a female socket 36 of conventional design. The plug and socket connection just described not only establishes an electrical connection through conductor 10 to the telemetry equipment on the surface, it also defines a coupling that can be disconnected when the detachable lower section 24L of the case containing the gamma source 14 is removed from upper section 24U.

Fixed shield 18 and movable shield 20 cooperate with one another in the position shown to encase the source of induced gamma radiation 14 in a lead-walled jacket such that it is ineffective to irradiate the surrounding formation. The movable shield 20 is, however, operatively linked to reversible electric motor 38 through threaded shaft 40 and nut 42 located within well 44 in the base thereof such that upon actuation of the motor in one direction, it will lower the movable shield exposing the gamma source 14 so that it can irradiate whatever lies in surrounding relation thereto. Reverse rotation of the motor will, of course, return the movable shield 20 to the position shown.

One very important feature to be borne in mind is the fact that both detectors 12U and 12S are shielded at all times from the direct radiation produced by the gamma source 14 due to the presence of fixed shield 18. Thus, the only gamma radiation that can reach either detector from source 14 must do so by the circuitous route of passing out into the formation and scattering back into the detectors. On the other hand, gamma radiation of sufficient intensity emanating from within the formation itself can, of course, reach both detectors directly. It follows that with the gamma source 14 housed and protected inside the well 44 of movable shield 20, the only gamma radiation reaching either of the detectors 12U or 12S will be that which originates within the formation.

While the shielded and unshielded detectors 12S and 12U are of conventional design, some explanation should be given of their construction and function for a proper understanding of the information to be derived therefrom. To begin with, and most important, is the fact that the shielded detector 12S does not block all gamma radiation, but instead, it is selectively or preferentially shielded so that if only detects radiation above a preselected energy level, say 400 Kev. This is accomplished in accordance with the teaching of Dodd, Czubek and others (see previous Dodd and Czubek references) by making a shield containing lead, cadmium and copper in the proportions stated therein. Thus, the shielded detector sees, with some degree of efficiency, all gamma radiation above 400 Kev or thereabouts while the unshielded one sees with some degree of efficiency all gamma radiation above approximately 60 Kev, even it being selective to this degree.

The detector crystals actually used both consist of thallium-activated sodium iodide although other types could be used such as, for example, intrinsic germanium, etc. While it is well within the skill of the art to vary both the crystal size and efficiency; one configuration of the tool employs a $\frac{1}{2}$ inch$\times\frac{1}{2}$ inch crystal in the unshielded detector, and a $\frac{3}{4}$ inch$\times 1$ inch crystal in the shielded detector, the former being spaced some 23.5 inches from the source with 17 inches being about the minimum that can be employed without having to make substantial changes in the design of the probe.

The particular source of gamma radiation (14) employed to irradiate the formation consisted of 50 mc $^{137}$Cs in one configuration and 50 mc $^{60}$Co in another. The activity of the named sources, however, may be varied, as well as the type of source used, with the basic considerations being as follows:

(1) the source used should have a gamma energy level above approximately 0.1 Mev and less than approximately 3 Mev, and
(2) the source detector distance should be chosen so as to provide near optimum back-scattered radiation from the adjacent formation to the detector.

Bearing in mind the structure of the tool just set forth, the method of using same will be described in detail.

The first step in the method is, as one might expect, to lower what is commonly referred to in the trade as a "sonde" or device similar "tool" into a bore hole that at least passes into, if not through, the suspected uranium-bearing formation. Ordinarily, radiation readings are taken every six inches or so through the full depth of the unknown radioactive deposit. At each level, a total of three different readings are taken as follows:

(1) The gamma count seen by the unshielded detector 12U with the source of induced gamma radiation 14 shielded and rendered ineffective inside the well 44 of shield 20.
(2) The gamma count seen by the shielded detector 12S with the source of induced gamma radiation 14 shielded as in (1) above; and
(3) The count rate as seen by the unshielded detector with the external source 14 exposed so as to irradiate the surrounding formation.

These three readings can, obviously, be taken in any order although the logical sequence is to take readings from both detectors with the external source covered and one using the unshielded detector with it exposed. In fact, it is preferable to record the number of counts per second seen by each of the two detectors simultaneously in steps (1) and (2), and in step (3).

As previously noted, unshielded detector 12U will be reading in step (1) all the gamma radiation emitted directly by the adjacent formation that has an energy level above approximately 60 Kev. Shielded detector 12S, on the other hand, will be reading in step (2) that which comes directly from the formation with an energy level above about 400 Kev. It is this step that provides the data from which a determination of the apparent grade of $U_3O_8$ in an unknown formation can be made. In step (3) the unshielded detector reads the radiation level above 60 Kev; however, it now sees the "natural" levels determined in steps (1) and (2) supplemented by the induced back-scattered radiation supplied by exposed external source 14 and the X-ray fluorescence caused by the photoelectric effect in uranium-bearing ore bodies.

The natural gamma court revealed by steps (1) and (2) provides data for a ratio of unshielded apparent grade to shielded apparent grade (U/S) which, in accordance with the teaching of my earlier application is, in and of itself, useful in indicating an anomalous state of equilibrium in the unknown formation. In order to properly understand how the data gained in steps (1)–(3) of the method provide the analyst with useful information concerning the unknown formation, it will first be necessary to go into a fair amount of background information concerning the characteristics of these uranium-bearing formations, how they get the way they are, how long it takes, what is being seen in the way of radiation by the detectors, the relative activities of $U_3O_8$ and its daughter products, the measuring instruments, their calibration, and the so-called "test pits" used in the calibration thereof.

First, it will be well to look at the basic characteristics of a uranium-bearing formation. For purposes of preliminary evaluation, one starts with the premise that the uranium/daughter product system is in equilibrium even though it often is not. It takes roughly a million years for this system to reach equilibrium at the relatively slow rate at which $^{238}U$ and $^{235}U$ decay to gamma ray emitting daughters. By way of contrast, its daughter products in the "radium decay-series" which include $^{222}Rn$, $^{214}Bi$, $^{214}Pb$, etc., are prolific gamma ray emitters and most have relatively short half lives. Also, some components of the uranium/daughter product system are quite water soluble and, therefore, in the presence of ground water, the characteristics of the system can change almost overnight.

At this point one asks, what difference does it make that the system is not in equilibrium? The answer is, of course, that the radiometric estimation of contained $U_3O_8$ in an unknown subsurface formation is predicated upon the assumption that it is present in the system at the concentration where it exists in equilibrium with its daughter products. Obviously, if a condition of disequilibrium exists, then there may be more or less $U_3O_8$ present than is indicated by the daughter product gross gamma count and this is vital information to know before one undertakes the tremendous capital expenditure required to mine the deposit.

Now, the specific activities of the key elements in which we are interested are as follows, each being expressed in terms of the number of photons emitted by one cubic centimeter of the elemental material per second:

$U = 2.8 \times 10^4$ ph/sec.

$Th = 1.0 \times 10^4$ ph/sec.

$K = 34$ ph/sec.

$Ra = 8 \times 10^{10}$ ph/sec.

A great deal can be learned from the above listed specific activities. To begin with, and most important, the activity of radium is some $2\frac{1}{2}$ million times that of uranium. Thus, as a practical matter, the detectors are, for the most part, seeing the gamma radiation from the radium-series daughter products, not the uranium. Be that as it may, if the system is at or near equilibrium, the percentage by weight of contained uranium is simple to calculate based upon comparable readings taken from known uranium-bearing deposits in equilibrium.

As will appear presently, another factor of equally significant importance, is the fact that each of these elements has a mass attenuation coefficient (Evans, H. B.,1965 "Grape"—A device for continuous determinations of material density and porosity—SPWLA Logging Symposium Trans Vol. 2, p. B1–B25) that affects the gamma count seen by the detectors. By a proper selection of the gamma source (14) in the tool P, the mass attenuation coefficients of the three most commonly involved elements, namely, radium, uranium and thorium, can be shown to have approximately the same magnitude. Remember also that the specific activity of thorium, for instance, is only about one-third that of uranium while that of radium is 2.5 million times greater. If, therefore, the detector is seeing a given count rate, it could be coming from x% uranium or 3 x% thorium or $1/(2.5\times 10^6)$ x% radium. It becomes apparent, therefore, that the amount of gamma radiation attenuated by the radium with respect to a given count rate is negligible but that of the uranium or thorium can easily be so great as to distort the true facts concerning the disequilibrium, if any, present in the uranium/daughter product system. A prime objective of the instant invention remains, therefore, that of providing the means for looking behind this mask and ascertaining the true state of affairs!

Before leaving the discussion of the specific activities it would be well to point out that the activity of potassium is so low as to be negligible compared with the orders of magnitude of the others. Its influence, therefore, on the count rate seen by the detectors is minimal and may be ignored in all but extreme cases, where the potassium concentration is very high, i.e. of the order of 2–10%. Of more practical significance by far is the fact that neither thorium nor potassium are generally found in these high level concentrations in association with sedimentary uranium deposits here in the United States or elsewhere in North America although, obviously, either or both of these elements may be present in ore bodies yet to be discovered.

The tool P of the instant invention, since it has two detectors, one unshielded (12U) and a shielded one (12S) yields information upon which a ratio of count rates can be derived (U/S) which is the count rate seen by the unshielded detector divided by that of the shielded one. As will appear presently, this information in and of itself can be very informative even without inducing any back-scatter by means of the external source 14.

Figure 2:
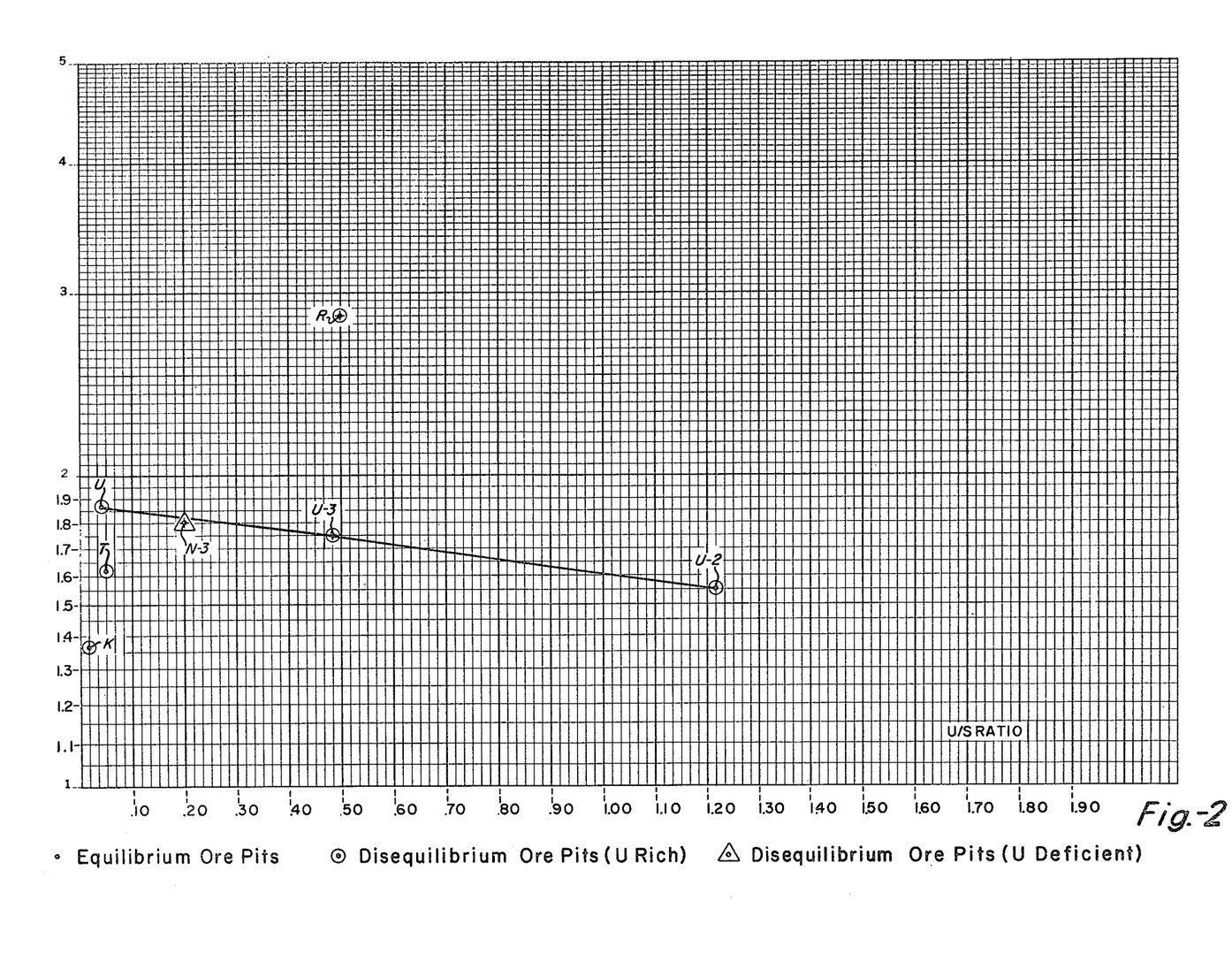
FIG. 2 is a graph representing the ratio of natural gamma radiation measured in a known uranium-bearing formation at equilibrium plotted against the percentage of contained uranium as seen by the shielded and unshielded detectors.

When calibrating the tool or tools in the standard pits, one gathers data which can provide a basis for any one of several different useful graphs. In terms of the instant tool P, one very useful graph is that which plots the ratio U/S against the grade of $U_3O_8$ expressed as a percentage by weight of the latter in the test pit which is supposedly at equilibrium with its daughter products. It is such a graph which is shown in FIG. 2.

With this as a background, it is time to look at what can be learned about an unknown uranium-bearing formation from the data gained, first of all, from steps (1) and (2) of the method, and finally, steps (1) and (2) considered together with additional data on the induced back-scatter or X-ray fluorescence. Step (1), of course, is standard practice and it provides the analyst with a rough approximation of the grade of uranium present in the unknown formation if, the uranium/daughter system is in equilibrium. In other words, the unshielded detector 12U is reading essentially all the gamma radiation emanating from the unknown ore body because the only thing being blocked out is the "noise", i.e. the radiation below approximately 60 Kev. Thus, if a particular calibrated tool shows, say 1000 counts per second at a given depth, one can multiply this count rate by the K-factor for the tool and come up with a radiometric equivalent of $U_3O_8$ which we will assume for purposes of illustration amounts to 0.3%. The foregoing is based upon the assumption that the unknown ore body is in a state of equilibrium and the test pits within which the tool was calibrated truly were also. If so, then 0.3% estimate is probably a reasonably accurate figure since it was derived basically from comparative data taken from a known test pit at equilibrium. As already noted, this can be a dangerous conclusion to reach because the system may not be in a state of equilibrium. It becomes apparent, therefore, that the count rate seen by the unshielded detector alone cannot be relied upon to present a true picture of the equilibrium condition existent within the unknown uranium-bearing formation although conceivably, it could. Unfortunately, experience has shown that all too often, single readings such as this do, in fact, present a false indication of the true state of affairs.

What then, if anything additional, can the analyst learn from step (2) of the method? Once again, we face the selfsame situation as was the case with the unshielded detector, namely, if the conditions present in the unknown ore body closely approximate those existent in the test pits in which the shielded detector was calibrated, then and only then does the indicated uranium grade have any real meaning; otherwise, the data taken thereby is subject to the same misinterpretation as readings taken by the unshielded detector alone. Many attempts have been made over the years to selectively screen the radiant energy emanating from a radioactive formation including the method such as is done in step (2) of the instant method in the hope that the data derived therefrom would, in fact, reveal something more about the equilibrium condition of the system; however, insofar as applicant is aware, these attempts have proven to be fruitless on other than a research basis involving as they do complex electronic scanning systems, etc.

Accordingly, steps (1) and (2) by themselves say little about the state of disequilibrium or equilibrium of the system. It is only when the information from these two steps is considered together with information resulting from induced radioactivity that the true state of affairs can be evaluated. Looking first at the simple U/S ratio determined from steps (1) and (2), if nothing else, it tells the observer a little bit about the producers of the emitted energies. In the tool configuration from which the data in FIG. 2 was derived, U/S ratios which fall below the plotted curve for any given "equivalent" grade of $U_3O_8$ would either tend to indicate that high energy gamma emissions such as either Th or K, were predominant in the system because they penetrated the shield on (12S) and thereby lowered the values of the U/S ratio; or, alternatively, that the total radium-series spectrum was not being proportionately attenuated by contained uranium as it would have been if the formation were in equilibrium. Conversely, if the U/S ratio were higher than predicted from the curve, then the indications are that a preponderance of the "younger" radium-series daughter products, i.e. radon, etc. were probably present because, while they have very high specific activities, they also have a generally lower total energy spectrum and a significant portion of their emissions would likely have been screened out by the shielded detector. This ratio alone, therefore, tells the observer more about the unknown ore body than was revealed by either detector by itself.

Carrying this U/S ratio further, if the point of intersection of the ratio and the apparent uranium grade for the unknown ore body falls upon the curve (FIG. 2) plotted about these same factors from the test pit, then we have a much more reliable indication that the unknown system is in equilibrium than either step (1) or step (2) could provide by themselves. The indication is still a long way from being a certainty, yet, it is far better than a mere suspicion which is about all that either the shielded and unshielded detectors reveal alone. Obviously, there are states of disequilibrium which could, conceivably, provide a false indication that the system was, in fact, in equilibrium but, for all practical purposes, such a situation would be so rare that its effect can be disregarded. It is not unusual, however to find that the point from the unknown ore body signifying the intersection between the U/S ratio and the apparent uranium grade falls above or below the curve generated by experimental data from the test pits. In the material which follows, an attempt will be made to show what this means, or could mean, and how, in accordance with the teaching found herein and in my earlier application, the observer can make such a determination with a certainty heretofore impossible by merely sampling and comparing downhole radiation levels.

We have already seen that plotting the U/S ratio vs. the apparent $U_3O_8$ concentration of the unknown ore body against the same plot for the illustrative test pits curve provides the observer with additional information as to whether the system is in a state of equilibrium or not. Such as the situation indicated in FIG. 2 by the points K and T. For instance, if the plot of the unknown ore body falls below the corresponding $U_3O_8$ test pit curve (see points K and T), one suspects that the formation is in a state of radiometric disequilibrium because its the spectra that contains an abnormally high concentration of high energy gamma rays, most likely due to the presence of thorium and/or potassium. In other words, with an overabundance of high energy gamma sources in the formation, much of the gamma energy is above the cut-off threshold of the shielded detector (400 Kev) and, presumably at least, most of it reaches *both* detectors. This, of course, raises the count rate seen by the shielded detector(s) in relation to that of the unshielded detector (U) thereby lowering the U/S ratio well below that of an ore body at equilibrium.

The opposite also appears to be true, namely, when a plot (point R in FIG. 2) of the unknown ore body that falls well above the curve for the standard $U_3O_8$ pits, it is indicative of an increased abundance of low energy gamma rays. These low energy emissions are passed through to the unshielded detector 12U while they are blocked by the shielded one thus producing a U/S ratio considerably higher than a corresponding grade of $U_3O_8$ at equilibrium. Several as yet untested hypothetical conditions of radiometric disequilibrium could conceivably yield such a distribuion of energies; however, the major concern here remains one of insuring that the indications of severe radiometric disequilibrium are apparent.

Confirmation of these hypotheses was obtained by calibrating the tool in a standard thorium pit and a standard potassium pit. The point labeled "Th" on the plot was taken from the standard thorium test pit and it falsely indicated an apparent grade of some 0.05% contained $U_3O_8$. The point labeled "K" was similarly derived from a standard potassium test pit and it can be seen to falsely indicate a $U_3O_8$ grade of 0.01%. Both plots revealed U/S ratios considerably below that of the standard $U_3O_8$ pit at the same count rate, that of potassium being the lower of the two high energy emitters. Conversely, a plot of a test pit containing an increased abundance of low level gamma rays (point R) demonstrated a U/S ratio of nearly 3:1 (see FIG. 2) when it should have been down somewhere around 1.8:1 or 1.9:1 if the system were in a state of equilibrium.

At this point, the observer can be reasonably certain that the unknown formation is in a state of disequilibrium. One could also surmise that if the U/S plot from the unknown formation misses the curve from the standard pits a long way, then the disequilibrium condition is greater than if they closely approach one another. Also, having fairly well established the fact that the unknown formation is in a state of disequilibrium, one can look at its graphical representation with reference to the equilibrium curve and whether it is an emitter of primarily high energy gamma (>400 Mev) such as might result from the presence of Th or K or, alternatively, an emitter rich in lower energy gamma radiation (>60 Kev) which might indicate the presence of an excess of abnormal concentrations of $^{226}Ra$ and/or Rn isotopes. Left unsolved, however, is the major influencing factor of how much, if any, has the gamma energy been attenuated and masked by those elements in the system like uranium itself having high mass absorption characteristics. It is at this point where the induced back-scatter from external source 14 comes into play. Moreover, I now realize that yet another factor must be taken into account, namely, the photoelectric effect which results in the phenomena of X-ray fluorescence.

Step 3 is the most significant of the first three because both of the external sources 14 currently employed in the tool ($^{137}Cs$ and $^{60}Co$) are relatively high energy sources (0.66 Mev and 1.17–1.33 Mev) and, for this reason, some components of the back-scatter will be detected by both the shielded and the unshielded detectors. The magnitude of the attenuated signal seen by either detector will be a function of the quantity of high "Z" number elements contained in the formation, i.e. radium, thorium or uranium, each of which has a mass attenuation coefficient of approximately the same order of magnitude with reference to the external gamma sources listed above. There should, therefore, be a specific absorption of the externally introduced gamma rays for any grade of uranium ore as calculated from the natural gamma count. If, for instance, this gamma count were due solely to radium, the absorption would be negligible because the quantity of contained radium necessary to generate the equivalent gamma activity would be of the order of only $2.5 \times 10^{-6}$ that of uranium. Thorium, on the other hand, since its activity is only one-third that of uranium, would absorb proportionately more of the induced gamma for the same equivalent natural gamma count.

Accordingly, in step (3), the method disclosed in my earlier application reveals that if the back-scatter count is only minimally attenuated, the chances are quite good that the source of the gamma radiation is the radium-series of daughter products because the activity of these daughter products is so high that there can be but little present in the system and what is there is incapable of attentuating the induced radiation to any appreciable degree. It should be borne in mind that there is bound to be some attenuation of the radiant energy, both induced and natural, due to the matrix itself; however, this is not of the same order of magnitude as that which is produced by these radium-series daughter products and, therefore, the negligible attenuating effect of the latter is readily recognized especially in the light of the U/S ratio and apparent grade learned from steps (1) and (2).

The remaining condition was that in which step (3) revealed a much more substantial attenuation of the induced gamma radiation than one would expect to find if the percentage of contained $U_3O_8$ were present as indicated from the data revealed by steps (1) and (2). This meant in nearly every instance that substantially higher amounts of $U_3O_8$ were present than indicated from the gross gamma count, since, as has already been shown, one could determine whether uranium or thorium was responsible for the attenuation from the U/S ratio alone.

In my earlier application previously identified it was my thought at the time that a formation in a state of uranium-rich radiometric disequilibrium would exhibit a materially higher U/C ratio than a formation having the same apparent grade of $U_3O_8$ at equilibrium, the U/C ratio being defined as the natural radiation as seen by the unshielded detector 12U divided by the total radiation seen by the same detector with the source added. I felt this would occur because the excess of uranium present in such a formation would attenuate the induced gamma radiation such that the unshielded detector 12U with the source 14 uncovered would see less back-scatter than the same detector would see in a formation at equilibrium. Following this hypothesis, the U/C ratio should be larger than that found from a test pit having the same apparent grade of uranium but in a state of equilibrium. Saying this another way, the U/C ratio would be expected to plot above the calibration curve under conditions of uranium-rich disequilibrium.

I have now discovered in accordance with the teaching of the instant invention that, quite unexpectedly, the opposite of what I thought would occur does, in fact, take place in those ore bodies having an apparent grade of $U_3O_8$ around 5% or less. More specifically, after logging several ore zones in a state of disequilibrium (both uranium-rich and uranium-deficient) containing known concentrations of $U_3O_8$, instead of finding that the U/C ratio for a uranium-rich disequilibrium zone apparently containing 5% or less $U_3O_8$ fell above the calibration curve, it unexpectedly fell below. Conversely, while I would have expected the U/C ratio for a given apparent grade of $U_3O_8$ to fall below the calibration curve in those uranium-deficient zones in a state of disequilibrium, it unexpectedly fell above the curve.

I now realize that, while the induced gamma radiation emanating from the exposed source 14 is, in fact, attenuated by the overabundance of uranium present, what I failed to realize was that this same induced radiation excited the electrons of the uranium atoms causing them to give off X-rays which materially increased the count rate seen by the unshielded detector with the source exposed well above that which I expected to see. This phenomena, in retrospect, is the well recognized photoelectric absorption of the induced gamma rays that causes the uranium atoms to fluoresce and give off X-rays.

Figure 3:
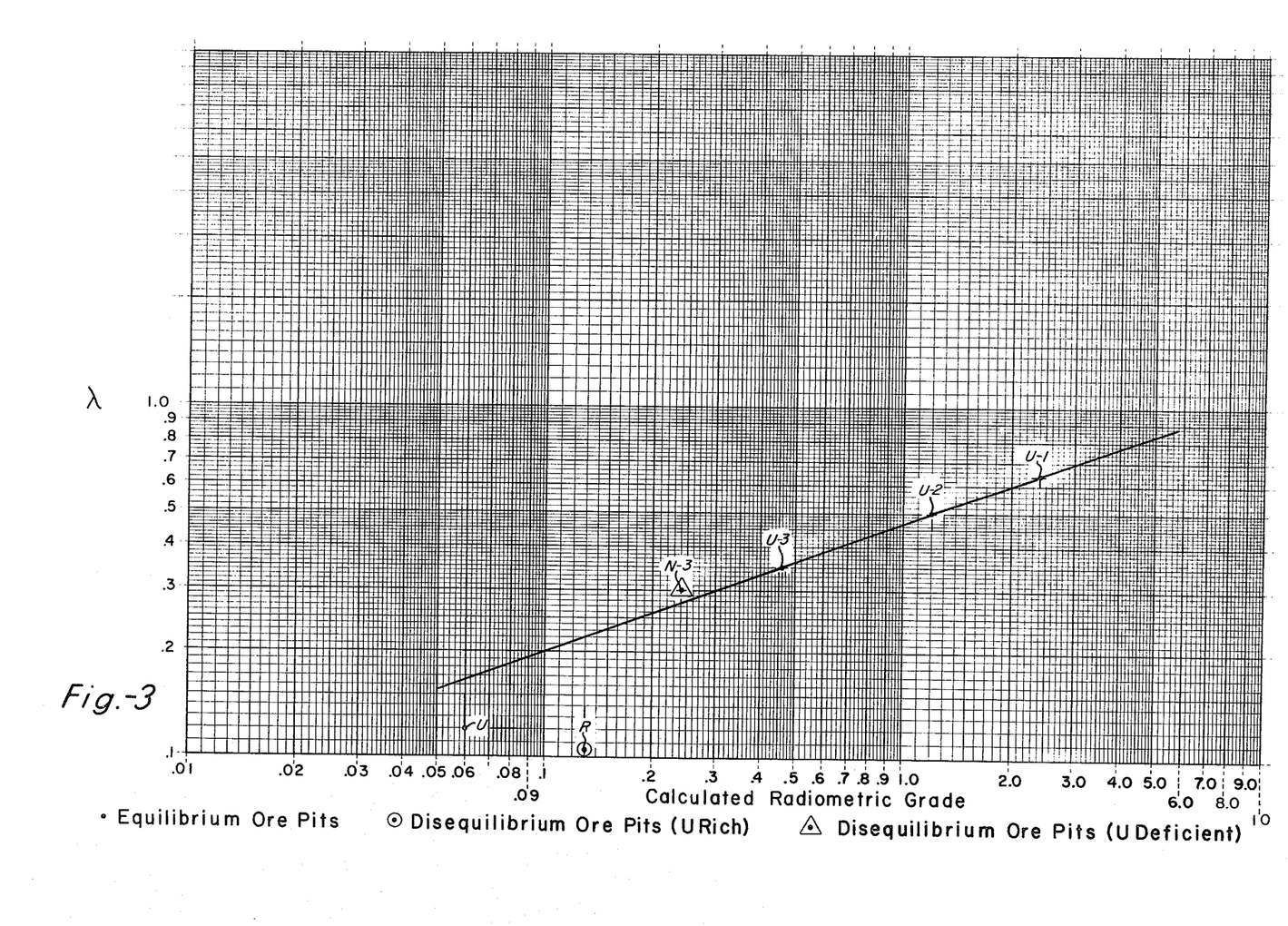
FIG. 3 is a graph plotting the ratio of natural gamma radiation above >400 Kev as seen by the shielded detector divided by essentially all the radiation above >60 Kev as seen by the unshielded detector when uranium-bearing formations of known concentration are irradiated by an external source of $^{60}Co$ capable of inducing X-ray fluoresence, certain of these formations being in a state of radiometric equilibrium while others are in a state of radiometric disequilibrium; and, FIG. 4 is a graph plotting the same ratio as FIG. 3 using the same detectors but with a $^{137}Cs$ source replacing the $^{60}Co$.
Figure 4:
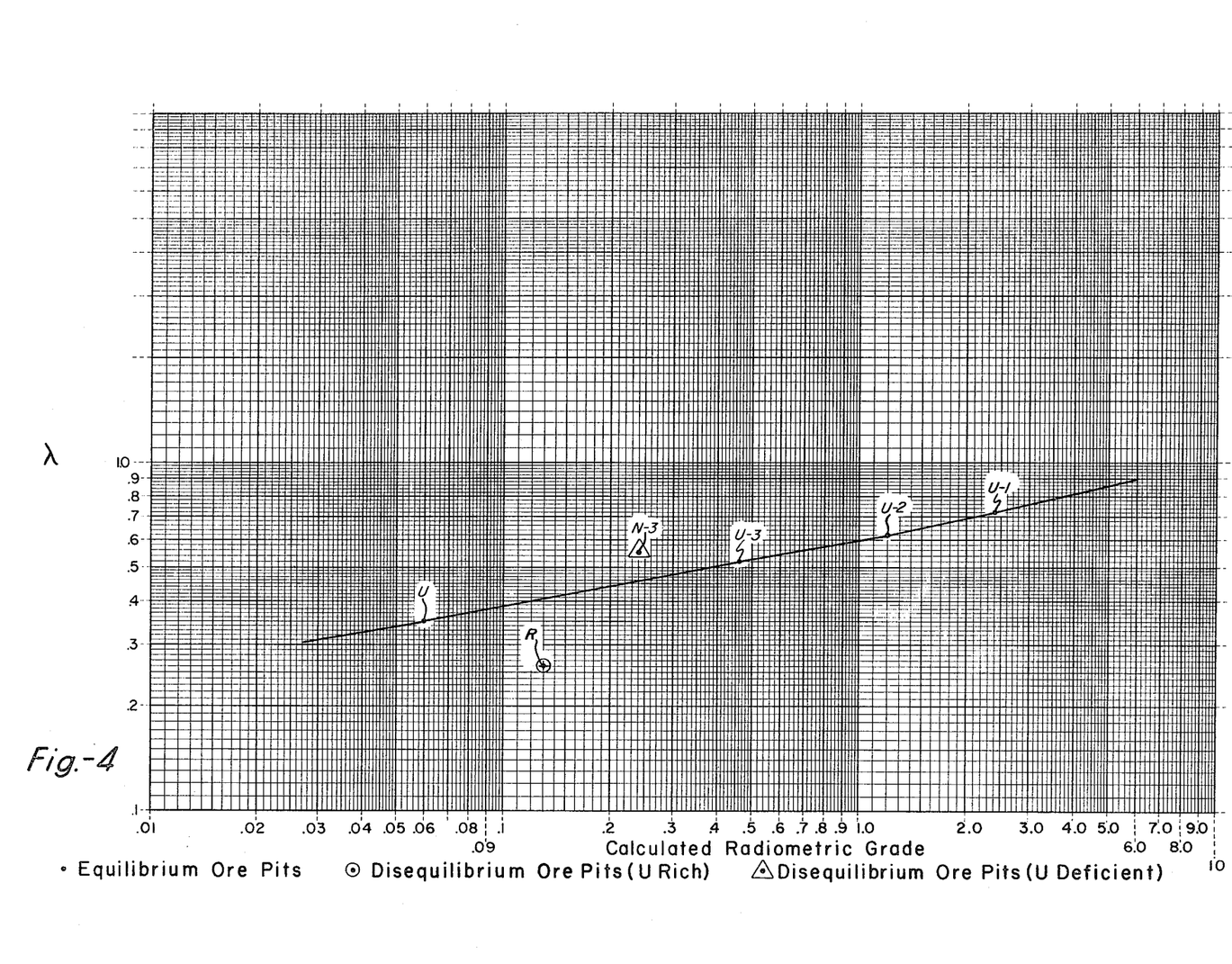

FIGS. 3 and 4 of the drawing to which reference will now be made are both log/log plots constructed using data taken from the same test pits as those from which I derived the U/C ratio in my earlier application. Now, however, I employ a different ratio than the U/C ratio, namely, the natural gamma counts as seen by the shielded detector 12S rather than the unshielded one divided, as before, by the counts as seen by the unshielded detector with the external source added, the latter ratio being defined herein as "$\lambda$". I did this because it became apparent to me that another ratio ($\lambda$) would provide a more quantitative analytical tool than the U/C ratio previously used. As seen in FIG. 3, the $\lambda$Co curve represents the values for $\lambda$ derived from the standard test pits (U, $U_1$, $U_2$ and $U_3$) known to be in a state of radiometric equilibrium using the $^{60}$Co source. In like manner, FIG. 4 is a similar plot using the $^{137}$Cs source. Overlayed on these same plots are the values for $\lambda$ derived from data taken from the test pits (R and N−3) known to be in a state of radiometric disequilibrium. In all the test pits, however, the concentration of $U_3O_8$ as well as the apparent radiometric grade are known. Clearly, those calibration model zones known to be in disequilibrium (N−3; R) do not fit either curve formed by those zones known to be in equilibrium; furthermore, the uranium-rich disequilibrium zone (R) falls below the equilibrium curve while the uranium deficient zone (N−3) falls above the equilibrium curve.

The decrease in low energy backscatter from the gamma source in uranium-rich disequilibrium zones is due to photoelectric absorption of the source gamma rays by uranium atoms; however, the photoelectric reactions cause the production of X-ray fluorescence from the uranium atoms electron energy levels. This X-ray signal increases the unshielded detector count rate and lowers the ratio of the unshielded count rate to the unshielded count rate with either of the external sources present. Similarly, the increase in this ratio ($\lambda$) in uranium deficient zones is due to a reduction in the photoelectric absorption-produced X-ray fluoescence, because of the uranium deficiency, which reduces the unshielded count rate with one or the other of the sources present (hence, increasing this ratio); in addition, the unshielded detector count rate increases because of the high specific activity of radium and its daughter products found in lieu of the uranium and this effect also results in an increase of this ratio.

What is claimed is:

1. The method of locating and evaluating subsurface uranium-bearing ore bodies which comprises the steps of: independently determining the natural gamma radiation above approximately 60 Kev and above approximately 400 Kev emanating from an unknown radioactive formation to establish a ratio thereof, comparing said ratio and the apparent grade of uranium represented thereby with a similarly derived ratio and actual grade determined from a known uranium-bearing ore body in radiometric equilibrium to ascertain if a condition of apparent disequilibrium exists in the unknown formation, irradiating the unknown formation with a gamma ray source of an energy level effective to induce X-ray fluorescence in uranium and determining the total of the natural radiation and the induced radiation resulting therefrom above a level of approximately 60 Kev, comparing said total with similar data derived from a known uranium-bearing ore body to ascertain if any substantial attentuation of the induced radiation has taken place or if measurable X-ray fluorescence is observed, and determining the approximate actual concentration of $U_3O_8$ present in said unknown formation based upon the observed attenuation of the induced radiation or, alternatively, the resultant X-ray fluorescence caused thereby.

2. The method as set forth in claim 1 in which the unknown formation is irradiated with gamma rays having an energy level above approximately 0.1 Mev but less than approximately 3 Mev.

3. The method as set forth in claim 1 in which the unknown formation is irradiated with a gamma source for which the mass absorption coefficients are of the same order of magnitude for uranium, thorium and radium.

4. The method as set forth in claim 1 in which the known uranium-bearing ore body irradiated to derive the data used for comparison is at equilibrium.

* * * * *